US012020648B2

(12) United States Patent
Brahma et al.

(10) Patent No.: US 12,020,648 B2
(45) Date of Patent: Jun. 25, 2024

(54) ROUTING FANOUT COUPLING ESTIMATION AND COMPENSATION

(71) Applicant: Apple Inc., Cupertino, CA (US)

(72) Inventors: Kingsuk Brahma, Mountain View, CA (US); Jie Won Ryu, San Jose, CA (US); Satish S Iyengar, Saratoga, CA (US); Yue Jack Chu, Cupertino, CA (US); Jongyup Lim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/215,722

(22) Filed: Jun. 28, 2023

(65) Prior Publication Data

US 2024/0038176 A1 Feb. 1, 2024

Related U.S. Application Data

(60) Provisional application No. 63/369,743, filed on Jul. 28, 2022.

(51) Int. Cl.
*G09G 3/3258* (2016.01)

(52) U.S. Cl.
CPC ... *G09G 3/3258* (2013.01); *G09G 2320/0209* (2013.01)

(58) Field of Classification Search
CPC .......................... G09G 3/3258; G09G 3/3266
See application file for complete search history.

(56) References Cited

U.S. PATENT DOCUMENTS

| | | | |
|---|---|---|---|
| 2014/0340417 | A1 | 11/2014 | Tanaka et al. |
| 2016/0044305 | A1 | 2/2016 | Kim et al. |
| 2018/0336823 | A1 | 11/2018 | Lin et al. |
| 2020/0388215 | A1 | 12/2020 | Kam et al. |
| 2021/0056930 | A1 | 2/2021 | Kang et al. |
| 2021/0118349 | A1 | 4/2021 | Choi et al. |
| 2023/0093204 | A1 | 3/2023 | Latif et al. |

FOREIGN PATENT DOCUMENTS

| | | |
|---|---|---|
| CN | 113450718 B | 6/2022 |

*Primary Examiner* — Sardis F Azongha
(74) *Attorney, Agent, or Firm* — Fletcher Yoder, P.C.

(57) ABSTRACT

Systems and methods are described here to compensate for crosstalk (e.g., coupling distortions) that may be caused by a fanout overlaid or otherwise affecting signals transmitted within an active area of an electronic display. The systems and methods may be based on buffered previous image data. Technical effects associated with compensating for the crosstalk may include improved display of image frames since some image artifacts are mitigated and/or made unperceivable or eliminated.

20 Claims, 11 Drawing Sheets

ROUTING FANOUT COUPLING ESTIMATION AND COMPENSATION

CROSS-REFERENCE TO RELATED APPLICATIONS

This application claims priority to U.S. Application No. 63/369,743, entitled “ROUTING FANOUT COUPLING ESTIMATION AND COMPENSATION,” filed Jul. 28, 2022, which is hereby incorporated by reference in its entirety for all purposes.

SUMMARY

This disclosure relates to systems and methods that estimate data fanout coupling effects and compensate image data based on the estimated coupling effects to reduce a likelihood of perceivable image artifacts occurring in a presented image frame.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

In certain electronic display devices, light-emitting diodes such as organic light-emitting diodes (OLEDs), micro-LEDs (μLEDs), micro-driver displays using LEDs or another driving technique, or micro display-based OLEDs may be employed as pixels to depict a range of gray levels for display. A display driver may generate signals, such as control signals and data signals, to control emission of light from the display. These signals may be routed at least partially through a “fanout”, or a routing disposed external to an active area of a display. However, due to an increasing desire to shrink bezel regions and/or perceivable inactive areas around an active area of a display, this fanout routing once disposed external to the active area may instead be disposed on the active area. Certain newly realized coupling effects may result from the overlap of the fanout and cause image artifacts or other perceivable effects to a presentation of an image frame.

To compensate for the coupling effects, systems and methods may be used to estimate an error from the coupling, determine a spatial map corresponding to the fanout overlap on the active area, and compensate image data corresponding to the spatial map to correct the error from the coupling within the localized area corresponding to the spatial map. Estimating the error may be based on a previously transmitted image frame. More specifically, the error may be estimated based on a difference in image data between a first portion of a image frame and a second portion of the image frame. These changes between line-to-line data within an image frame could result in capacitive coupling at locations in the fanout region of the active area. The crosstalk effects of capacitive coupling could, as a result, produce image artifacts. Thus, the image data of the current frame may be adjusted to compensate for the estimated effects of the crosstalk.

To elaborate, a compensation system may estimate crosstalk experienced by a gate control signal line overlapping a portion of the fanout. The fanout may be disposed over or under the gate control signal lines and the data lines of an active area of a display. The fanout may be disposed in, above, or under the active area layer of the display. The crosstalk experienced by the gate control signal line at a present time may be based on a difference between present image data (e.g., N data) and past image data that had been previously transmitted via the gate control signal line (e.g., N−1 data). The compensation system may apply a spatial routing mask, which may be an arbitrary routing shape per row. The spatial routing mask may enable the compensation system to focus on crosstalk experienced by one or more portions of the display that could experience crosstalk due to the fanout. This is because the fanout may be disposed above or below those portions of the display. The compensation system may estimate an amount by which image data transmitted to a pixel would be affected (e.g., distorted) by the crosstalk. Using the estimated amount, the compensation system may adjust a respective portion of image data for the pixel (e.g., a portion of image data corresponding to the present image data) to compensate for the estimated amount, such as by increasing a value of the present image data for the pixel to an amount greater than an original amount. This way, even if a portion of the present image data experiences crosstalk, image data sent to each pixel is mitigated for the crosstalk and any effects caused by the crosstalk are visually unperceivable by a viewer. By implementing these systems and methods, display image artifacts may be reduced or eliminated, improving operation of the electronic device and the display.

BRIEF DESCRIPTION OF THE DRAWINGS

Various aspects of this disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to electronic displays that use compensation systems and methods to mitigate effects of crosstalk from a fanout region interfering with control and data signals of an active area. These compensation systems and methods may reduce or eliminate certain image artifacts, such as flicker or variable refresh rate luminance difference, among other technical benefits. Indeed, an additional technical benefit may be a more efficient consumption of computing resources in the event that improved presentation of image frames reduces a likelihood of an operation launching an undesired application or otherwise instructing performance of an operation.

Figure 1:
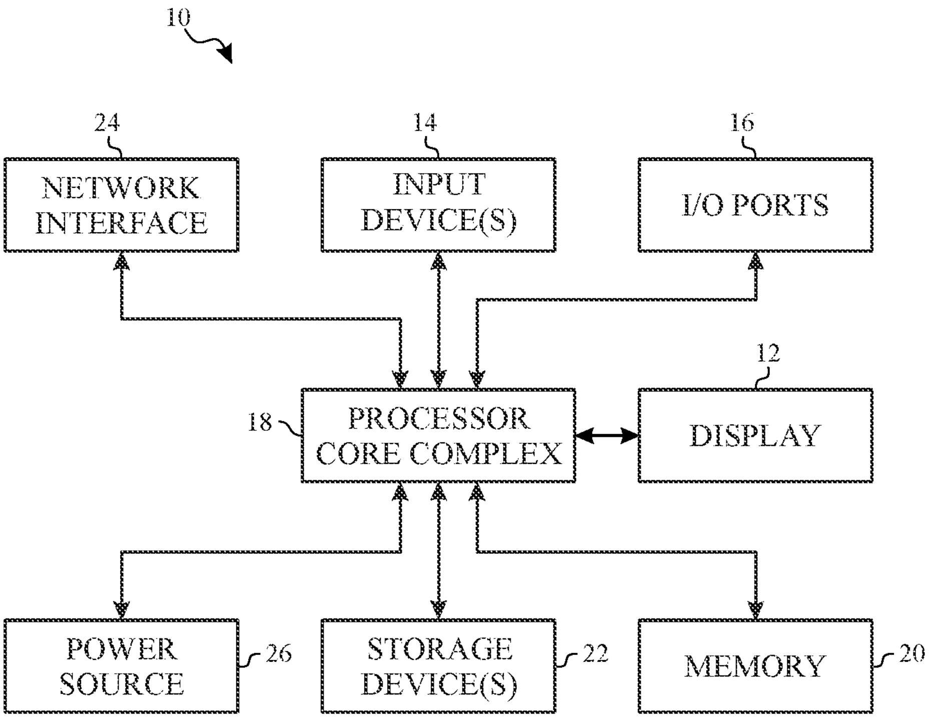
FIG. 1 is a schematic block diagram of an electronic device, in accordance with an embodiment.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

Figure 2:
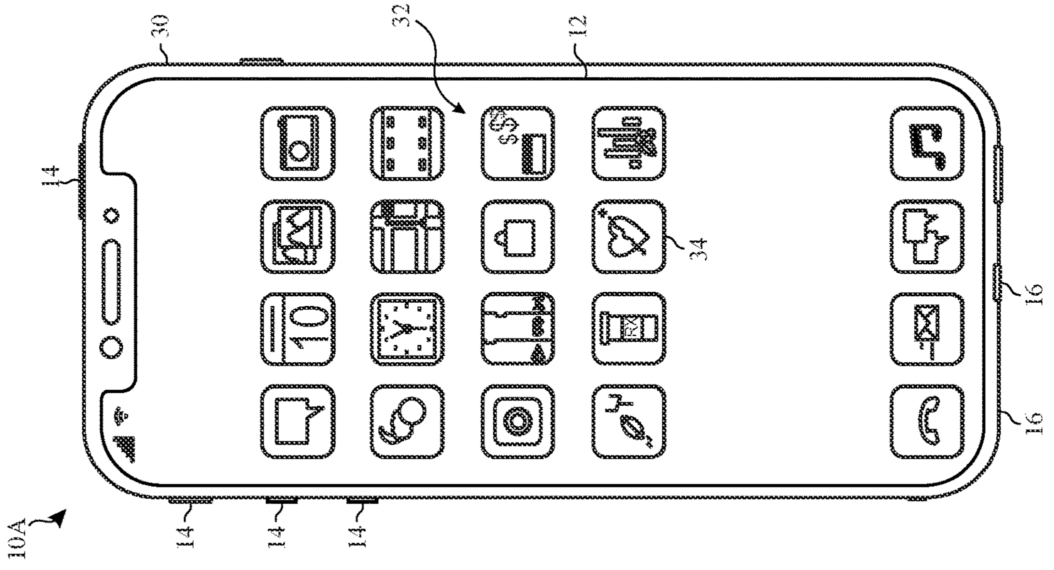
FIG. 2 is a front view of a mobile phone representing an example of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
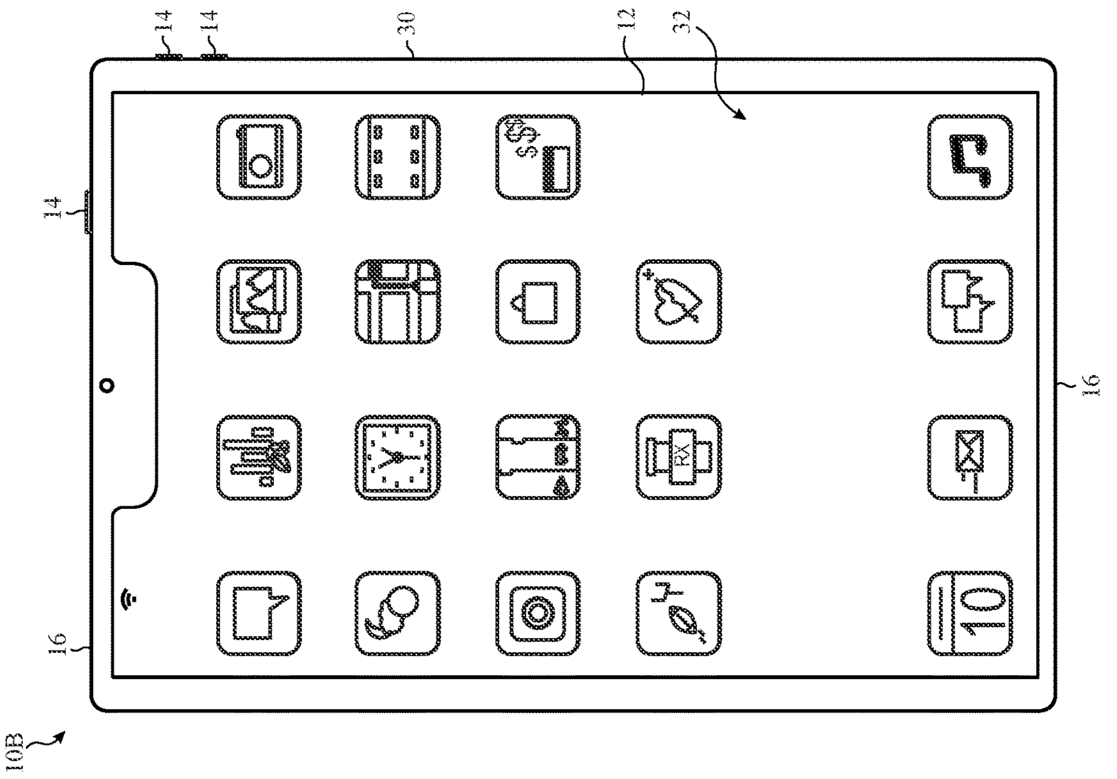
FIG. 3 is a front view of a tablet device representing an example of the electronic device of FIG. 1, in accordance with an embodiment.
Figure 4:
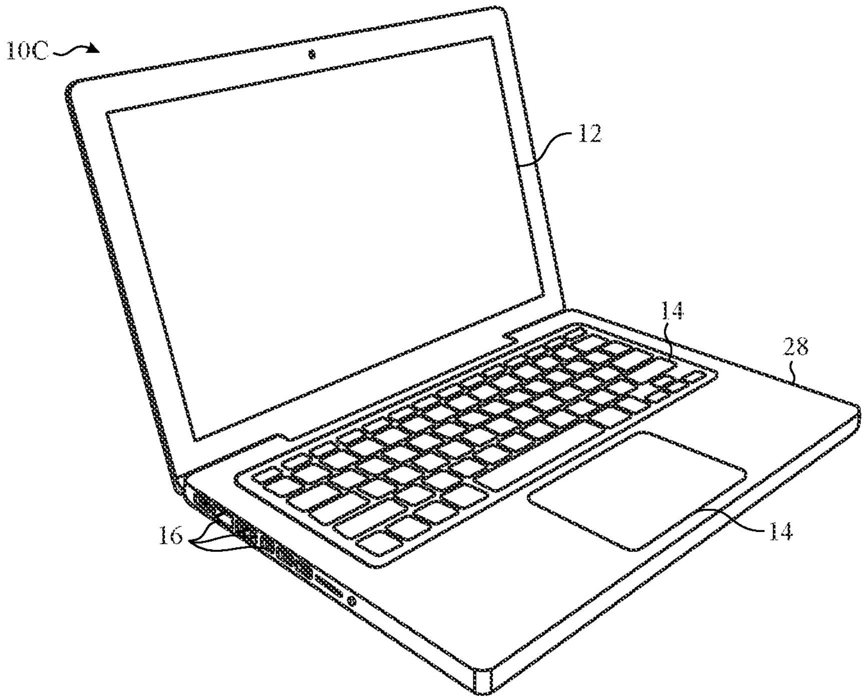
FIG. 4 is a front view of a notebook computer representing an example of the electronic device of FIG. 1, in accordance with an embodiment.
Figure 5:
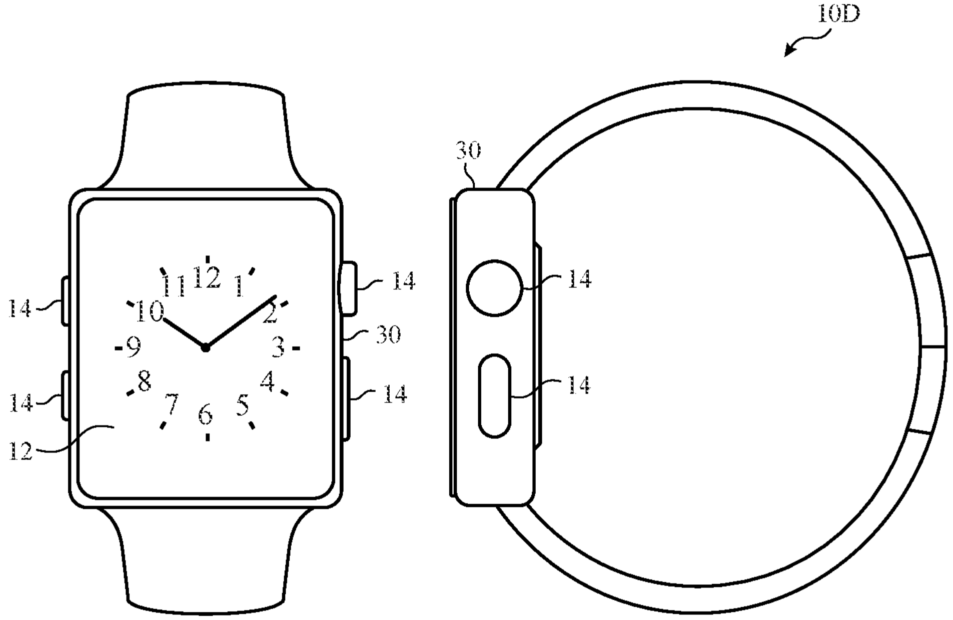
FIG. 5 are front and side views of a watch representing an example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
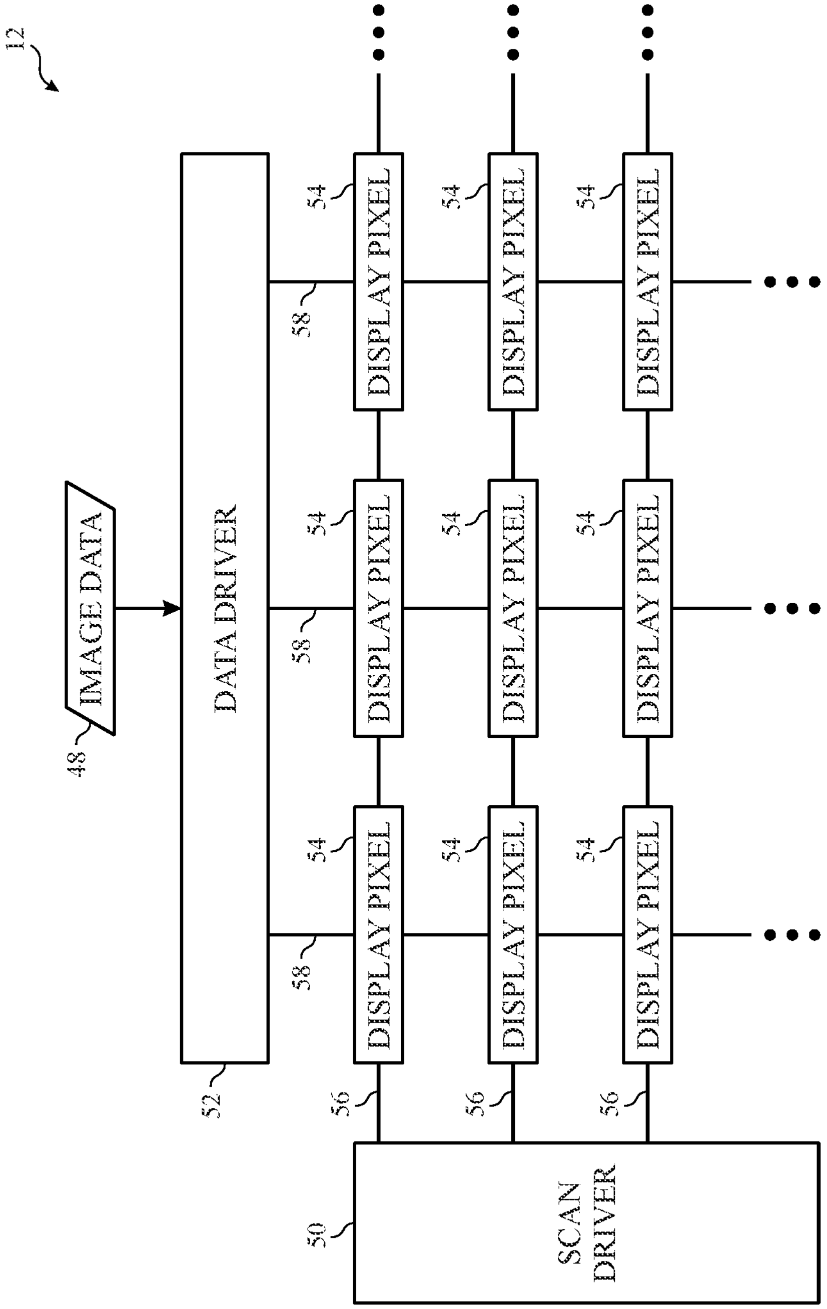
FIG. 6 is a block diagram of an electronic display of the electronic device, in accordance with an embodiment.

As shown in FIG. 6, the electronic display 12 may receive image data 48 for display on the electronic display 12. The electronic display 12 includes display driver circuitry that includes scan driver 50 circuitry and data driver 52 circuitry that can program the image data 48 onto pixels 54. The pixels 54 may each contain one or more self-emissive elements, such as a light-emitting diodes (LEDs) (e.g., organic light emitting diodes (OLEDs) or micro-LEDs (μLEDs)) or liquid-crystal displays (LCD) pixels. Different pixels 54 may emit different colors. For example, some of the pixels 54 may emit red light, some may emit green light, and some may emit blue light. Thus, the pixels 54 may be driven to emit light at different brightness levels to cause a user viewing the electronic display 12 to perceive an image formed from different colors of light. The pixels 54 may also correspond to hue and/or luminance levels of a color to be emitted and/or to alternative color combinations, such as combinations that use cyan (C), magenta (M), and yellow (Y) or others.

The scan driver 50 may provide scan signals (e.g., pixel reset, data enable, on-bias stress) on scan lines 56 to control the pixels 54 by row. For example, the scan driver 50 may cause a row of the pixels 54 to become enabled to receive a portion of the image data 48 from data lines 58 from the data driver 52. In this way, an image frame of image data 48 may be programmed onto the pixels 54 row by row. Other examples of the electronic display 12 may program the pixels 54 in groups other than by row.

The rows and columns of pixels 54 may continue to fill an entire active area of the electronic display 12. In some cases, the data driver 52 and the scan driver 50 are disposed outside the active area and in a bezel region. However, in some cases, the driving circuitry may be included above or below the active area and may be used in conjunction with a fanout.

Figure 7:
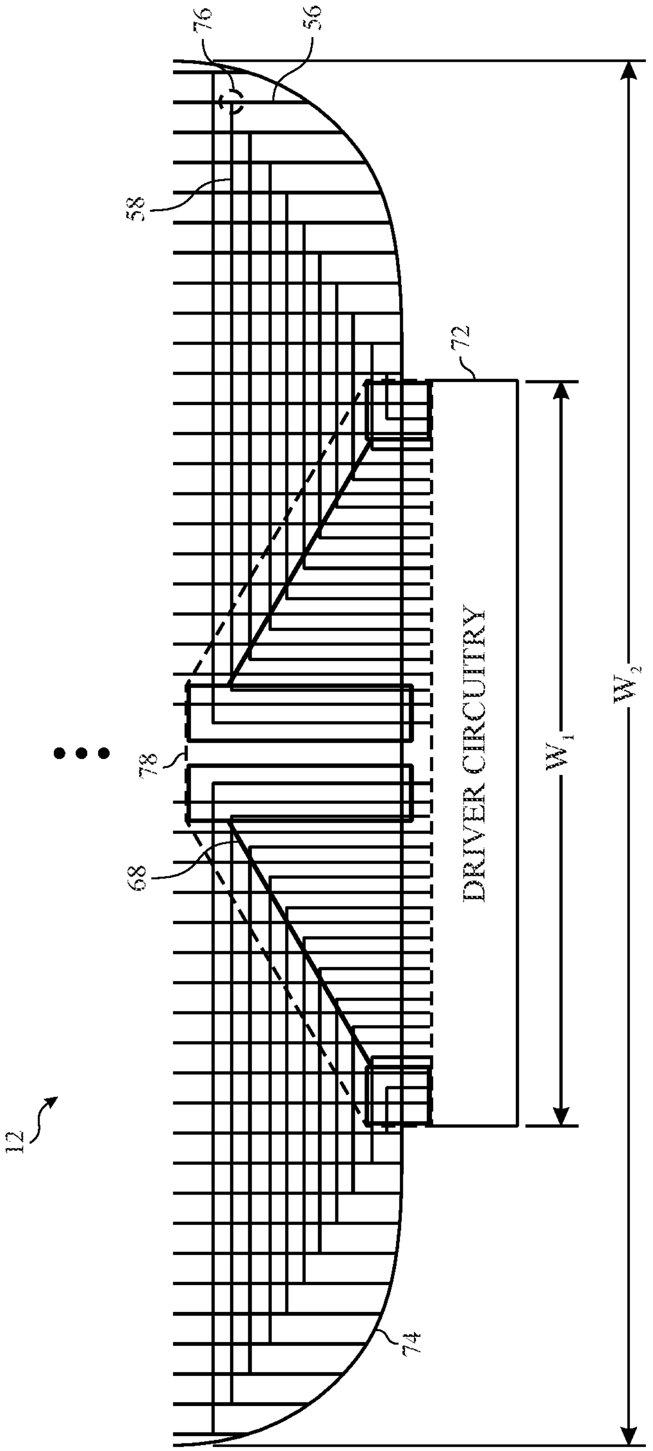
FIG. 7 is a block diagram of an example fanout of the electronic display of FIG. 1, in accordance with an embodiment.

FIG. 7 is a block diagram of an example electronic display 12 that includes a fanout 68 and driving circuitry 72 in a different layer than pixels 54 (e.g., above or below an active area layer in which display pixel 54 circuitry is located). The data driver 52 of FIG. 6, the scan driver 50 of FIG. 6, or both may be represented by driver circuitry 72. The driver circuitry 72 may be communicatively coupled to one or more control signal lines of an active area 74. The active area 74, and thus the corresponding control signal lines, may extend to any suitable dimension, as represented by the ellipsis. The driver circuitry 72 is shown as coupled to data lines 58. The control signal lines intersect at an intersection node 76 to a corresponding control signal line, here a scan line 56. It is noted that the driver circuitry 72 may, in some embodiments, be coupled to the scan lines 56 that intersect the data lines 58. Of course, other control lines may be used in addition to or in alternative of the depicted control lines.

When a width of the driver circuitry 72 or a flex cable from the driver circuitry 72 is not equal to a width of the electronic display 12, a fanout 68 may be used to route couplings between the driver circuitry 72 and the circuitry of the active area 74. Here, as an example, a width ($W_1$) of the driver circuitry 72 is more narrow than a width ($W_2$) of the electronic display 12 panel, and thus the fanout 68 is used to couple the driver circuitry 72 to the circuitry of the active area 74. It is noted that, in some cases, a flex cable may be coupled between the fanout 68 and the circuitry of the active area 74.

The fanout 68 may have more narrow widths between couplings (e.g., between data lines 58) on one side to fit the smaller width of the driver circuitry 72 and on another, opposing side, the fanout 68 may have expanded widths between the couplings to expand to the larger width ($W_2$) of the electronic display 12 panel, where the electronic display 12 panel may equal or be substantially similar to a width of the active area 74 when a bezel region of the electronic display 12 is removed. Previously, fanouts similar to the fanout 68 may have been contained within a bezel region of an electronic display. Now, increasing consumer desires for more streamlined designs may demand the bezel region be shrunk, or eliminated. As such, the fanout 68 may in some cases be moved to be disposed on the active area 74 to eliminate a need for as large a bezel region. Indeed, the fanout 68 between the driver circuitry 72 and the active area 74 may be overlaid on circuitry of the active area 74 (e.g., the scan lines 56 and data lines 58) to reduce a total geometric footprint of the circuitry of electronic display 12 and to enable reduction in size or removal of the bezel region.

The fanout 68 may introduce a coupling effect when the fanout 68 is disposed on a region 78 of the active area 74 (e.g., a portion of the scan lines 56 and data lines 58). Here, the region 78 of the fanout 68 corresponds to a triangular geometric shape, though any suitable geometry may be used. The region 78 corresponding to the region of overlap may be generally modelled as a geometric shape and used when mitigating distortion to driving control signals that may be caused by the overlap of the fanout 68.

Figure 8:
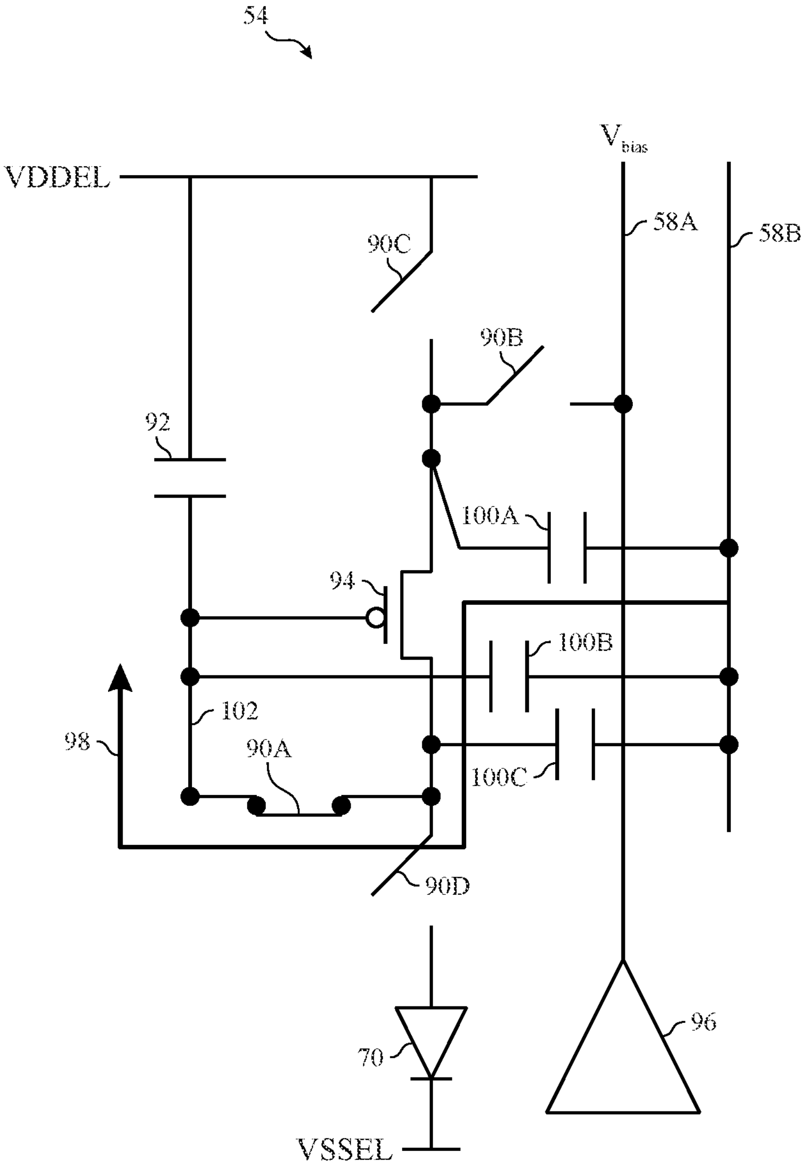
FIG. 8 is a circuit diagram of an example pixel of the electronic display of FIG. 1 showing an example coupling effect caused by the fanout of FIG. 7, in accordance with an embodiment.

FIG. 8 is a circuit diagram of an example pixel 54 that may experience distortion from signals transmitted via the fanout 68. In general, the pixels 54 may use any suitable circuitry and may include switches 90 (switch 90A, switch 90B, switch 90C, switch 90D). A simplified example of a display pixel 54 appears in FIG. 8. The display pixel 54 of FIG. 8 includes an organic light emitting diode (OLED) 70 that emits an amount of light that varies depending on the electrical current through the OLED 70. The electrical current thus varies depending on a programming voltage at a node 102.

The switch 90D may be open to reset and program a voltage of the pixel 54 and may be closed during a light emission time operation. During a programming operation, a programming voltage may be stored in a storage capacitor 92 through a switch 90A that may be selectively opened and closed. The switch 90A is closed during programming at the start of an image frame to allow the programming voltage to be stored in the storage capacitor 92. The programming voltage is an analog voltage value corresponding to the image data for the pixel 54. Thus, the programming voltage that is programmed into the storage capacitor 92 may be referred to as "image data." The programming voltage may be delivered to the pixel 54 via data line 58A. After the programming voltage is stored in the storage capacitor 92, the switch 90A may be opened. The switch 90A thus may represent any suitable transistor (e.g., an LTPS or LTPO transistor) with sufficiently low leakage to sustain the programming voltage at the lowest refresh rate used by the electronic display 12. A switch 90B may selectively provide a bias voltage Vbias from a first bias voltage supply (e.g., data line 58A). The switches 90 and/or a driving transistor 94 may take the form of any suitable transistors (e.g., LTPS or LTPO PMOS, NMOS, or CMOS transistors), or may be replaced by another switching device to controllably send current to the OLED 70 or other suitable light-emitting device.

The data line 58A may provide the programming voltage as provided by driving circuitry 96 (located in the driver circuitry 72) in response to a switch 90A and/or switch receiving a control signal from the driver circuitry 72. However, as shown in FIG. 7, for the programming voltage to arrive at the respective pixels 54, a portion of the data line 58A may run through the region of the fanout 68 of FIG. 7. If so, a different data line 58B may introduce electrical interference (e.g., undesirable electrical charge, distortion) into the signals of the pixel 54, as represented via illustration 98. This distortion may transmit to the pixel 54 via parasitic capacitances 100 (parasitic capacitance 100A, parasitic capacitance 100B, parasitic capacitance 100C). Once received, image data of the pixel 54 may be altered prior or during presentation of an image frame, causing perceivable image artifacts.

Figure 9:
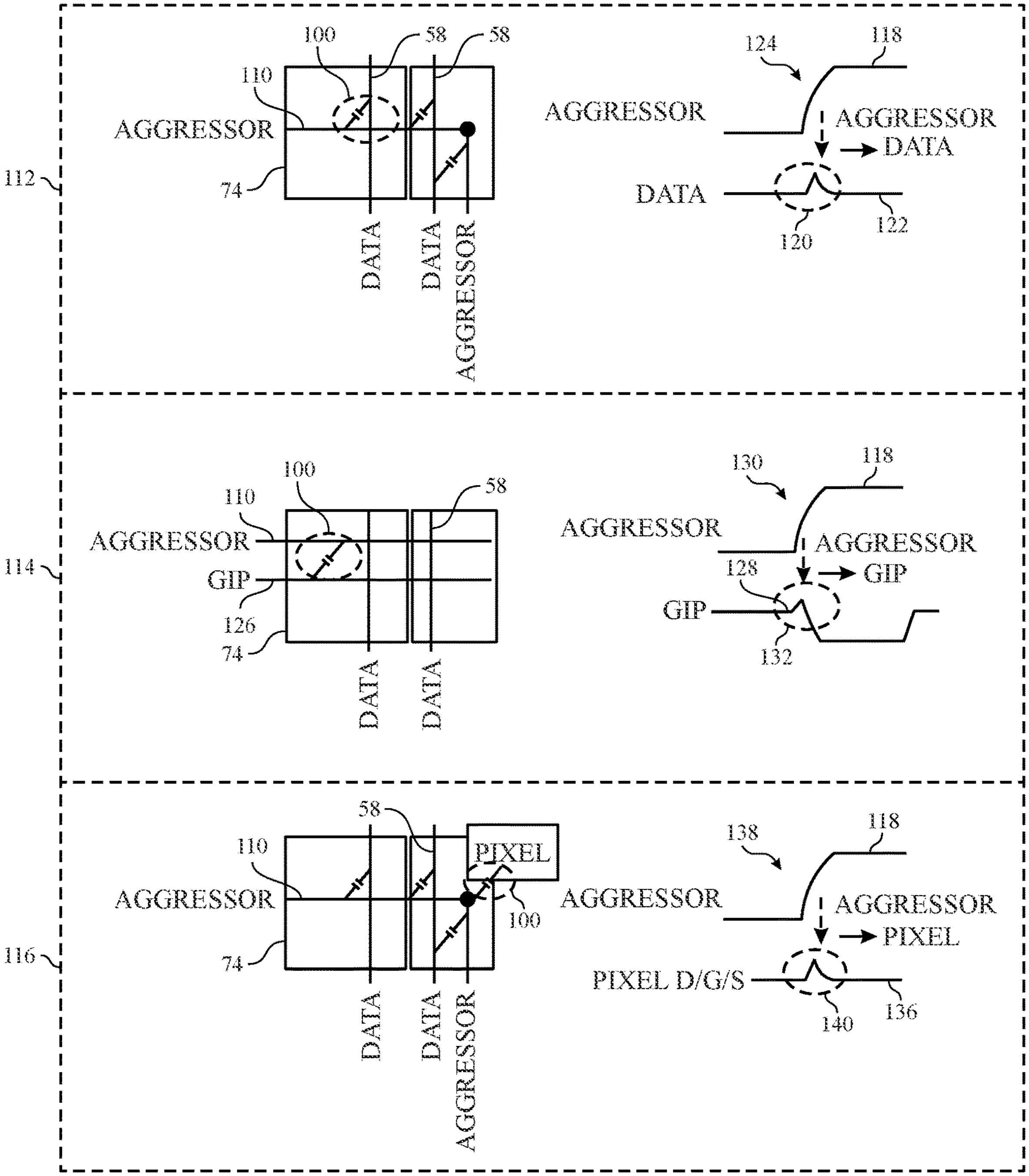
FIG. 9 is a diagrammatic representation of the example coupling effect caused by the fanout of FIG. 7, in accordance with an embodiment.

To elaborate, FIG. 9 is a diagrammatic illustration of distortion associated with the fanout 68. A portion of the data lines 58 associated with the fanout 68 (e.g., a portion of the data line 58B of FIG. 8) may be referred to as an "aggressor" control line 110 when transmitting a signal that affects another signal transmitted on another control line. Here, an aggressor control line 110 is illustrated as affecting operations of other various control lines. A first example 112, a second example 114, and a third example 116 of arrangements of the aggressor control line 110 are illustrated and described herein. In any of these examples, some or all of the aggressor control line 110 may be disposed above and/or below the illustrated data and control signal lines. Furthermore, the fanout 68 may include one or more aggressor control lines 110, and one aggressor control line 110 is used as a representative example herein.

In a first example 112, the aggressor control line 110 in a first arrangement in and/or on the active area 74 may influence data transmitted via data lines 58. The aggressor control line 110 may run partially parallel to and perpendicular to one or more data lines 58. When a signal 118 transmitted via the aggressor control line 110 changes value, a disturbance may cause a pulse 120 in a data signal 122 transmitted via either of the data lines 58. The signal 118 may disturb the data signal 122 via one or more capacitive couplings (e.g., parasitic capacitances 100) formed (e.g., in the conductor of the active area) while the signal 118 is transmitted. The resulting distortion may be illustrated in corresponding plot 124 as a pulse 120 in a value of the data signal 122.

In a second example, the aggressor control line 110 in a second arrangement in and/or on the active area 74 may influence data transmitted via gate-in-panel (GIP) lines 126. The aggressor control line 110 may be arranged perpendicular to the data lines 58 and parallel to the GIP lines 126. When the signal 118 transmitted via the aggressor control line 110 changes value, a disturbance may manifest in a value of a GIP signal 128 transmitted via the GIP line 126. The signal 118 may disturb the GIP signal 128 via a capacitive coupling (e.g., parasitic capacitance 100) formed in the conductor of the active area while the signal 118 is transmitted. The resulting distortion may be illustrated in corresponding plot 130 as a pulse 132 in a value of the GIP signal 128.

In a third example, the aggressor control line 110 in a third arrangement in and/or on the active area 74 may influence signals of a pixel 54. The aggressor control line 110 may be arranged perpendicular to the data lines 58 and adjacent to (or in relative proximity to) the pixel 54, where the pixel 54 may be a pixel 54 relatively near (e.g., adjacent, within a few pixels of) the aggressor control line 110. When the signal 118 transmitted via the aggressor control line 110 changes value, a disturbance may manifest in a value of a pixel control signal 136 transmitted between circuitry of the pixel 54. The pixel control signal 136 may be any suitable gate control signal, refresh control signal, reset control signal, scan control signal, data signal for a different pixel, or the like. Indeed, the signal 118 may disturb the pixel control signal 136 via a capacitive coupling (e.g., parasitic capacitance 100) formed in the conductor of the active area 74 while the signal 118 is transmitted. The resulting distortion may be illustrated in corresponding plot 138 as a pulse 140 in a value of the pixel control signal 136.

Figure 10:
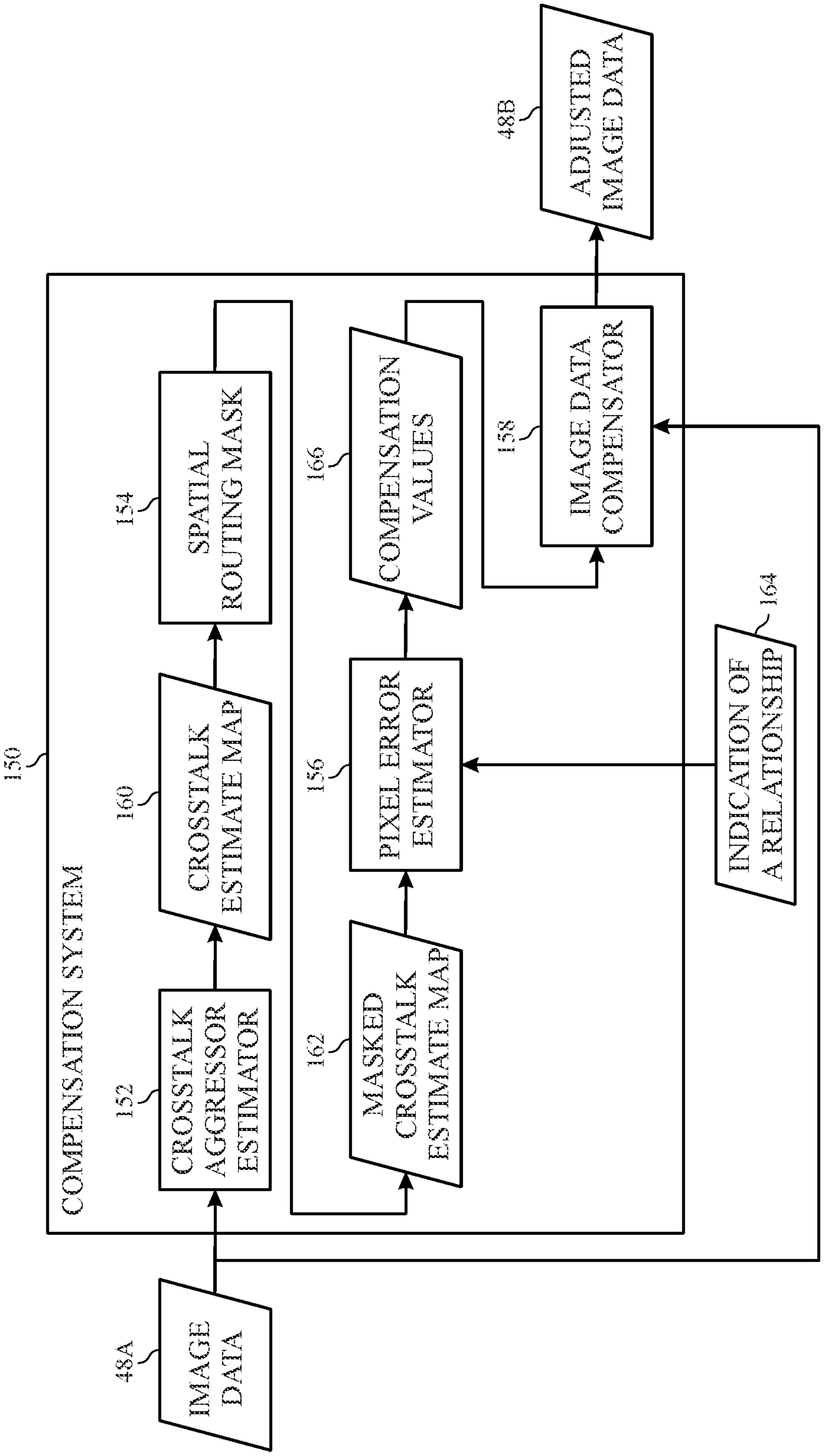
FIG. 10 is a block diagram of a compensation system operated to compensate for the example coupling effects shown in FIGS. 8-9, in accordance with an embodiment.

Keeping the foregoing in mind, any of the three example arrangements of the aggressor control lines 110 and thus the presence of the fanout 68 may cause image artifacts in presented image data, either by affecting the image data being presented and/or by affecting control signals used to control how and for how long the image data is presented. FIG. 10 is a block diagram of a compensation system 150 that performs operations to mitigate effects of coupling between the circuitry of the active area 74 and the fanout 68 (e.g., the aggressor control lines 110) on input image data 48A via adjustments to generate adjusted image data 48B. The driver circuitry 72 may include hardware and/or software to implement the compensation system 150. In some cases, the compensation system 150 may be included in a display pipeline or other image processing circuitry disposed in the electronic device 10 but outside the electronic display 12.

The compensation system 150 may include a crosstalk aggressor estimator 152, a spatial routing mask 154, a pixel error estimator 156, and/or an image data compensator 158, and may use these sub-systems to estimate coupling error based on an image pattern and apply a compensation to mitigate the estimated error. The image pattern may correspond to a difference in voltage values between presently transmitted image data 48A from a host device (e.g., an image source, a display pipeline) and between previously transmitted image data 48. The compensation system 150 may use the image pattern to estimate a spatial location of error. Then, based on the image pattern, the compensation system may apply correction in voltage domain to the image data corresponding to the estimated spatial location of error. The estimated spatial location of the errors may be an approximate or an exact determination of where on a display panel (e.g., which pixels 54) distortion from a fanout 68 may yield perceivable image artifacts.

To elaborate, the crosstalk aggressor estimator 152 may receive input image data 48A and estimate an amount of crosstalk expected to be experienced when presenting the input image data 48A. The amount of crosstalk affecting the data lines 58 may correspond to a change in image data between respective image data on data lines. That is, if there is no change in the image data sent on a same data line 58, no difference in value would be detected by the crosstalk aggressor estimator 152 and no crosstalk from the fanout 68 may affect the image data. A maximum difference in data value may be a change in data voltage from a lowest data value (e.g., "0") to a highest data value (e.g., "255" for a bit depth of 8 bits) or vice versa.

For each data line, the crosstalk aggressor estimator 152 may determine a difference between a previous data voltage and a present data voltage of the image data 48A, which indicates a voltage change on each individual data line. Taking a difference being two same rows of data at two different time (e.g., temporal difference determination).

The crosstalk aggressor estimator 152 may use a data-to-crosstalk relationship (e.g., function) that correlates an estimated amount of crosstalk expected to a difference in image data between two portions of image data. For data voltage swing to be compensated may occur between line-to-line differences of voltage data (e.g., one or more previous rows of data) within a single image frame. The data-to-crosstalk relationship may be generated based on calibration operations, such as operations performed during manufacturing or commissioning of the electronic device 10, or based on ongoing calibration operations, such as a calibration regularly performed by the electronic device 10 to facilitate suitable sub-system operations. The data-to-crosstalk relationship may be stored in a look-up table, a register, memory, or the like. The crosstalk aggressor estimator 152 may generate a crosstalk estimate map 160 that associates, in a map or data structure, each estimate of crosstalk with a relative position of the active area 74. The crosstalk estimate map 160 may include indications of expected voltages predicted to distort the image data 48A in the future (e.g., the incoming image frame). The crosstalk estimate map 160 may be generated based on previous image data (e.g., buffered image data) and, later, a region once processed via a mask. The estimates of crosstalk may be associated with a coordinate (e.g., an x-y pair) within the data structure and the data structure may correspond in dimensions to the active area 74. In this way, the coordinate of the estimate of crosstalk may correspond to a relative position within the active area 74 that the crosstalk is expected to occur and thus may be considered a coordinate location in some cases. The crosstalk aggressor estimator 152 may output the crosstalk estimate map 160.

In some cases, crosstalk from the fanout 68 may not only affect one data row, but may also affect previous data rows (e.g., rows disposed above or below the present data row being considered at a given time by the crosstalk aggressor estimator 152). For example, crosstalk from the fanout 68 may affect up to six rows in the active area 74 simultaneously (or any number of rows, N, depending on the display). Thus, the crosstalk aggressor estimator 152 may store up to N previous rows of the image data to be referenced when generating the crosstalk estimate map 160. For example, the crosstalk aggressor estimator 152 may include a buffer to store 6 rows of previous image data 48 processed prior to the present row. In other words, for the example of 6 rows, if image data for a present row being considered is Row N, the crosstalk aggressor estimator 152 may store and reference image data corresponding to Row N−1, Row N−2, Row N−3, Row N−4, Row N−5, and Row N−6 (or Rows N+1 . . . N+6) when generating the crosstalk estimate map 160. The crosstalk aggressor estimator 152 may use a weighted function to respectively weigh an effect of each of the previous Rows on the present row, Row N. In some cases, the weighted function may assign a greater effect to a more proximate row than a row further from the Row N. Thus, the crosstalk aggressor estimator 152 may generate the crosstalk estimate map 160 based on the image data for the present row, Row N, and based on the image data buffered for one or more previous rows.

The spatial routing mask 154 may receive the crosstalk estimate map 160 and may mask (or remove) a portion of the crosstalk estimate map based on a stored indication of a spatial map corresponding to the fanout 68 to generate a masked crosstalk estimate ma9 162. The indication of the spatial map may associate the relative positions of the active area (e.g., used to generate the crosstalk estimate map) with a region 78 of the fanout 68 described earlier, like with reference to FIG. 7. That is, the compensation system 150 may access an indication of the region 78 corresponding to where the fanout 68 actually is overlapping on the active area and this actual positioning or orientation is correlated to data locations within the data structure. The region 78, and thus the spatial routing mask 154, may correspond to a geometric shape, such as a triangular logical region. The spatial routing mask 154 may discard data disposed outside defined logical boundaries (e.g., locations in the data structure not corresponding to the region 78) and retain data disposed within the defined logical boundaries (e.g., locations in the data structure corresponding to the region 78). The logical boundaries of the spatial routing mask 154 may correspond to the region 78 of overlap of the fanout 68. The spatial routing mask 154 may receive the crosstalk estimate map 160, zero (or discard) crosstalk estimates outside the defined logical boundaries corresponding to the region 78, and retain, in a subset of the crosstalk estimate map 160, a subset of the crosstalk estimates that are located within the defined logical boundaries corresponding to the region 78. The retained subset of crosstalk estimates may be output and transmitted to the pixel error estimator 156 as a masked crosstalk estimate map 162. The masked crosstalk estimate map 162 may indicate which subset of circuitry of the active area 74 is expected to be affected by the fanout 68 and a magnitude of crosstalk that subset of circuitry is expected to experience.

The pixel error estimator 156 may receive the masked crosstalk estimate map 162 and determine an amount of error expected to affect one or more pixels 54 based on the subset of pixels 54 indicated and/or a magnitude indicated for the one or more pixels 54. The pixel error estimator 156 may access an indication of a voltage relationship 164 to determine an expected change to image data from the magnitude indicated in the masked crosstalk estimate map 162. The accessed indication of the voltage relationship 164 may be a scalar function that correlates an indication of crosstalk from the masked crosstalk estimate map to a constant increase in value. For example, a scalar value of 5 and a masked crosstalk estimate of 2 millivolts (mV) may yield a compensation value of 10 (mV). In this way, for each of the one or more pixels 54, the pixel error estimator 156 identifies a magnitude of the expected crosstalk from the masked crosstalk estimate map 162 and correlates that magnitude to a manifested change in image data expected to be experienced by that pixel 54. The pixel error estimator 156 may access a look-up table to identify the change in image data. In some cases, the pixel error estimator 156 may use a voltage relationship that accounts for changes in temperature, process, or voltages in the event that operating conditions affect how the magnitude of the expected crosstalk affects image data. The pixel error estimator 156 may generate and output compensation values 166.

The image data compensator 158 may receive the compensation values 166 and apply the compensation values 166 to the image data 48A. When the compensation values are defined pixel-by-pixel, image data may be adjusted based on the compensation values 166 for one or more pixels 54, respectively. When compensation values 166 are defined for multiple pixels 54, the image data 48A may be adjusted at one time for multiple pixels 54. The compensation values 166 may be applied as an offset to the image data 48A. Indeed, when the fanout 68 undesirably decreases voltages, to adjust the image data 48A, the image data compensator 158 may add the compensation values 166 to the image data 48A to generate the adjusted image data 48B (e.g., apply a positive offset). In this way, when being used at the pixel 54, any crosstalk experienced in the region 78 may decrease the adjusted image data 48B for that pixel down to a voltage value set intended as the image data 48A, thereby mitigating the effects of the crosstalk. However, if the fanout 68 undesirably increases voltages, to adjust the image data 48A, the image data compensator 158 may subtract the compensation values 166 to the image data 48A to generate the adjusted image data 48B (e.g., apply a negative offset) so that crosstalk experienced in the region 78 may increase the adjusted image data 48B for that pixel up to a voltage value set intended as the image data 48A, thereby mitigating the effects of the crosstalk. Once compensated, the adjusted image data 48B may be output to the driver circuitry 72 and/or to the data lines 58 for transmission to the pixels 54. The adjusted image data 48B may be an image data voltage to be transmitted to the pixel 54 to adjust a brightness of light emitted from the pixel 54. In some cases, the adjusted image data 48B may be a compensated grey level to be converted into control signals to adjust a brightness of light emitted from the pixel 54.

Figure 11A:
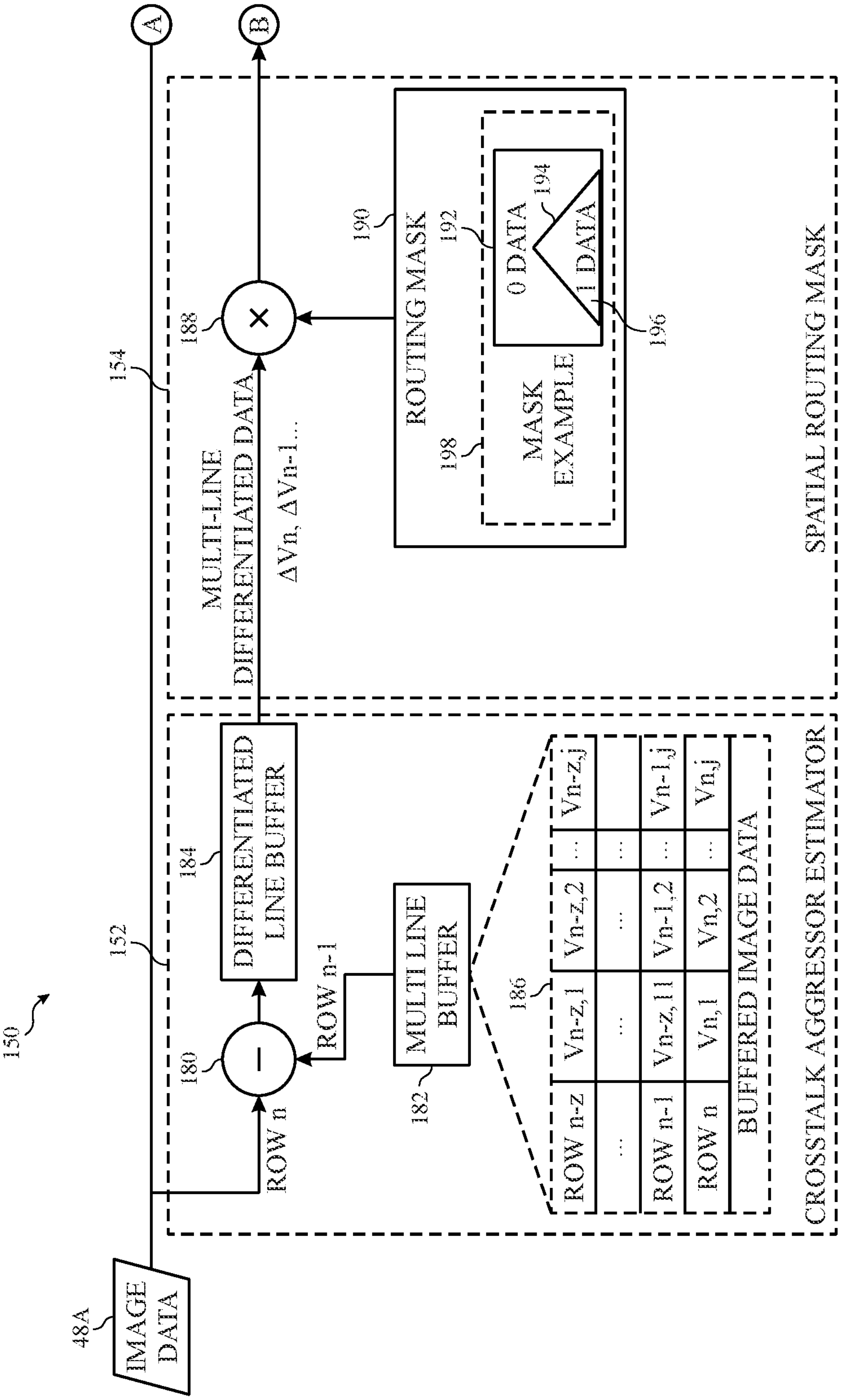
FIG. 11A and FIG. 11B are diagrammatic representations of an example compensation system of FIG. 10 operated to compensate for a triangular fanout of FIG. 7, in accordance with an embodiment.
Figure 11B:
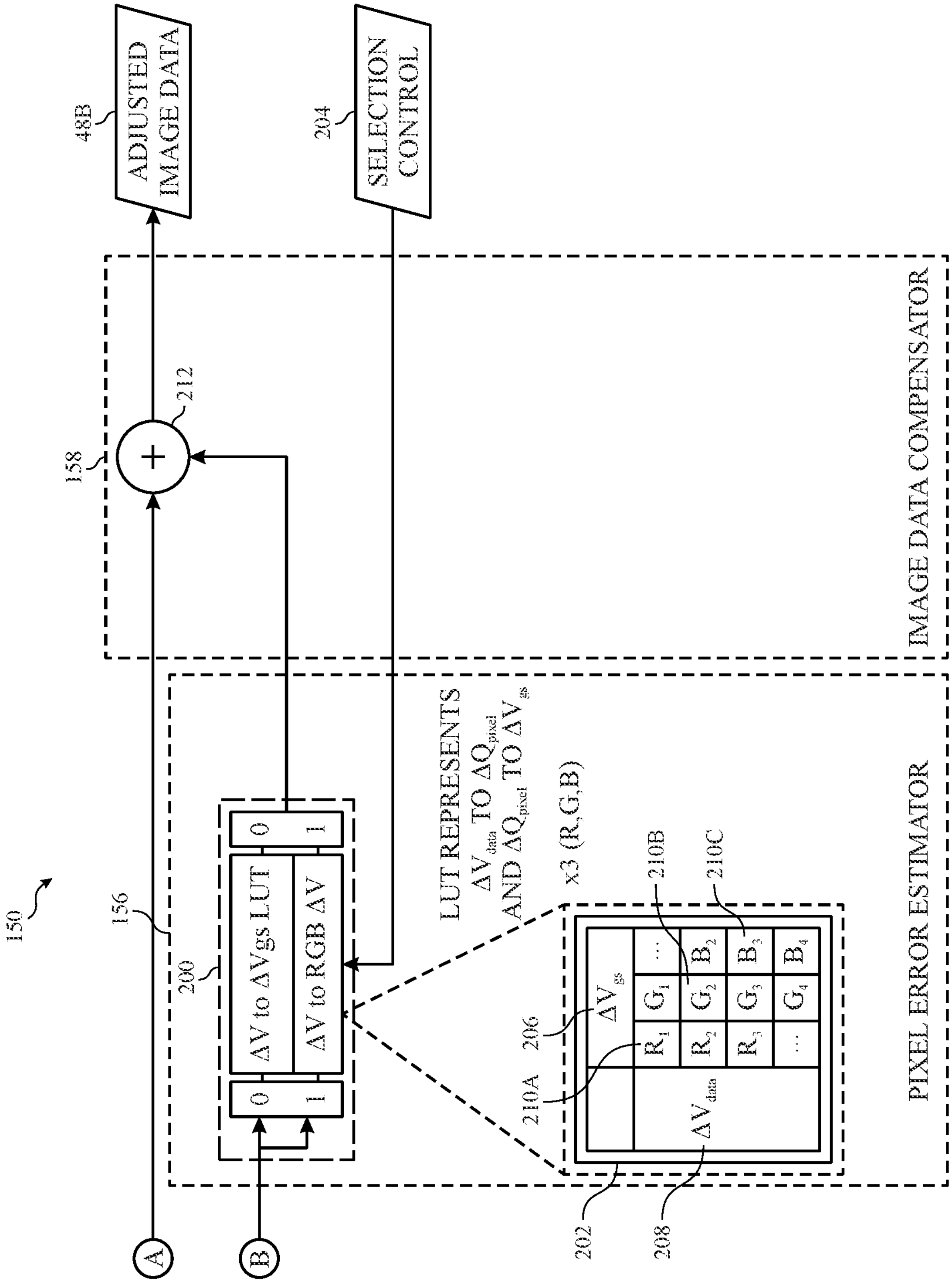

FIG. 11A and FIG. 11B are diagrammatic representations of an example compensation system 150 of FIG. 10 operated to compensate for a fanout of FIG. 7. FIG. 11A and FIG. 11B may be referred to herein collectively as FIG. 11. Indeed, in both the compensation system 150 of FIG. 10 and FIG. 11 more or less components or circuitry may be included in the systems that what is depicted. Furthermore, as described above, the driver circuitry 72 may include hardware and/or software to implement the compensation system 150. In some cases, the compensation system 150 may be included in a display pipeline or other image processing circuitry disposed in the electronic device 10 but outside the electronic display 12.

In one example, the crosstalk aggressor estimator 152 may include a subtractor 180, a buffer 182, and a differentiated line buffer 184. The buffer 182 may store the actual image data 48A sent to the compensation system 150 by another portion of the electronic device 10 and/or image processing circuitry—that is, the buffer 182 receives the image data intended to be displayed, which may uncompensated image data. The buffer 182 may be a multi-line buffer that stores a number, Z, of previous rows of image data as buffered image data 186, where a current row is row N.

The image data 48 corresponding to the entire active area 74 may correspond to thousands of rows (e.g., 1000, 2000, 3000, . . . X rows) and each row correspond to each pixel value for the rows. When the buffer 182 is a multi-line buffer, the buffer 182 may store a few of the rows of data, like 5, 6, 7, or a subset of Y rows. The buffer 182 may be a rolling buffer configuration, such that corresponding rows are buffered in line with how an image frame is display via rolling the image frame from one side of the active area 74 to an opposing side of the active area 74.

The buffered image data 186 may include a number of columns, j, corresponding to a number of pixels associated with the respective rows. The number of columns of the buffered image data 186 may correspond to a number of columns of pixels in the active area 74, a number of data values used to represent image data for a pixel 54, a number of data values used to represent image data for a pixel 54, a number of binary data bits to represent the image data 48, or the like. The subtractor 180 may receive the image data 48A and a corresponding output of previous image data (e.g., one or more rows of the buffered image data 186) from the multi-line buffer 182.

The subtractor 180 may transmit a difference between the present image data 48A and the previous image data to the differentiated line buffer 184. As described above, the crosstalk aggressor estimator 152 may generate the crosstalk estimate map 160 output based on one or more previous rows of image data, the present row of image data, and previously transmitted image data. Thus, the crosstalk aggressor estimator 152 may generate the crosstalk estimate map 160 based on both temporally changing image data and spatially changing image data. The subtractor 180 shown in FIG. 11 may represent multiple subtractors or may perform multiple rounds of difference determination based on a number of columns and/or a number of rows in the buffered image data 186.

The differentiated line buffer 184 may output the generated crosstalk estimate map 160 to one or more multipliers 188 of the spatial routing mask 154. Here, the spatial routing mask 154 multiplies the crosstalk estimate map 160 with a routing mask 190 to selectively transmit one or more portions of the crosstalk estimate map 160. As described earlier, the routing mask 190 may correspond to logical boundaries 194 that substantially match or are equal to a geometric shape, arrangement, or orientation the region 78 of the fanout 68 is overlaid on the active area 74. The routing mask 190 may include zeroing data (e.g., "0" data 192) to cause the spatial routing mask 154 to remove one or more values from the crosstalk estimate map 160 when generating the masked crosstalk estimate map 162. The routing mask 190 may include retaining data (e.g., "1" data 196) to cause the spatial routing mask 154 to retain one or more values from the crosstalk estimate map 160 when generating the masked crosstalk estimate map 162. Here, the masked crosstalk estimate map 162 may include data corresponding to the "1" data 196 of the example mask 198 without including data corresponding to the "0" data 192 of the example mask 198. Indeed, the masked crosstalk estimate map 162 may include zero values (e.g., 0 data values) for the portions of the map corresponding to the "0" data 192 of the example mask, which also corresponds to a region of the active area outside of the region 78 and thus the region negligibly affected, if at all, by the fanout 68.

The multiplier 188 may output the masked crosstalk estimate map 162 to the pixel error estimator 156. The pixel error estimator 156 may receive the masked crosstalk estimate map 162 at conversion selection circuitry 200. The indication of a relationship 164 of FIG. 10 may correspond to a look-up table 202 shown in FIG. 11. The pixel error estimator 156 may use the conversion selection circuitry 200 to select between different modes in the voltage domain that may change how the indication of a relationship 164 is referenced during the processing.

The conversion selection circuitry 200 may receive a selection control signal 204 from external circuitry (e.g., display pipeline, processor core complex 18). The selection control signal 204 may control which mode the conversion selection circuitry 200 uses to generate the compensation values 166 from the masked crosstalk estimate map 162. In response to a first selection control signal 204 (e.g., when the selection control signal 204 has a logic low value), the conversion selection circuitry 200 may use a first mode and convert a change in voltage (e.g., ΔV) indicated via the masked crosstalk estimate map 162 to a change in a gate-source voltage ($\Delta V_{gs}$) used to change a value of a voltage sent to the driving transistor 94. In response to a second selection control signal 204 (e.g., when the selection control signal 204 has a logic high value), the conversion selection circuitry 200 may use a second mode and convert a change in voltage (e.g., ΔV) indicated via the masked crosstalk estimate map 162 to a change in a RGB data voltage (e.g., RGB ΔV) used to change a value of a voltage used to determine control signals sent to the pixel 54.

The pixel error estimator 156 may generate a different set of compensation values 166 based on which mode is selected of the conversion selection circuitry 200. In some cases, the pixel error estimator 156 may reference a same look-up table 202 for both modes. As an example, the look-up table 202 shows a relationship between a change in gate-source voltages ($\Delta V_{gs}$) 206 relative to a change in data voltage (e.g., $\Delta V_{DATA}$) 208. Indeed, the look-up table 202 may also represent different relationships for the different color values as well (e.g., R, G, B value may correspond to respective compensations).

Furthermore, in some cases, the pixel error estimator 156 may generate the compensation values 166 while in a grey code (grey) domain. For example, an image processing system may generate image data as one or more bits (e.g., 8 bits) and transmit the binary image data as the image data 48A to the compensation system 150. The compensation system 150 may receive the binary image data via the image data 48A and process the binary image data to determine the compensation values. The image data 48A, binary or analog, is used represent a brightness of the pixel 54, and thus the binary data transmitted as the image data 48A may indicate in the grey domain a brightness at which the pixel 54 is to emit light. The look-up table 202 of FIG. 11 and/or the indication of a relationship 164 of FIG. 10 may be used to transform the image data between the grey domain and the voltage domain. Indeed, the look-up table 202 and/or the indication of a relationship 164 may include information to aid the generation of grey domain pixel data ($Q_{pixel}$) from voltage data ($V_{data}$), and vice versa, and then to aid generation of gate-source voltages ($V_{gs}$) from the grey domain pixel data, and vice versa. The look-up table 202 and/or the indication of a relationship 164 may include information to transform changes in image data between the grey domain and the voltage domain, such as generating a change in grey domain pixel data pixel, ($\Delta Q_{pixel}$) based on a change in voltage data ($\Delta V_{data}$) for that pixel, and vice versa, and/or generating a change in gate-source voltages ($\Delta V_{gs}$) from a change in the grey domain pixel data pixel ($\Delta Q_{pixel}$), and vice versa.

The pixel error estimator 156 may generate the compensation values 166 based on respective RGB data values 210 (R data values 210A, G data values 210B, B data values 210C) of the look-up table 202. The pixel error estimator 156 may transmit the compensation values 166 to the image data compensator 158. The compensation values 166 may match a formatting of the look-up table 202, which may use less resources to output to the image data compensator 158. The compensation values 166 alternatively may be modified during generation as to include RGB data to be used directly by the image data compensator 158 at an adder 212 (e.g., adding logic circuitry, adder logic circuitry, adding device). In this way, the compensation values 166 output from the pixel error estimator 156 may be in a suitable format for use by the adder 212 when offsetting the image data 48A.

To elaborate, the image data compensator 158 may add the compensation values to the image data 48A as described above with regards to FIG. 10. Here, the image data compensator 158 uses an adder 212 to add the compensation values 166 to the image data 48A (e.g., original image data, unchanged image data). The image data compensator 158 may receive the same image data 48A received by the crosstalk aggressor estimator 152 and process the image data 48A in a same domain as that used by the pixel error estimator 156 (e.g., voltage domain, grey domain). Here, the compensation values 166 are used as an offset to adjust (e.g., increase via adding a positive value, decrease via adding a negative value) a value of one or more respective portions of image data 48A. The compensation values 166 may cause an offset to be added to the value of the image data 48A to oppose an expected change caused by the disturbance from the fanout 68 region 78, such as was described with reference to FIG. 10.

Figure 12:
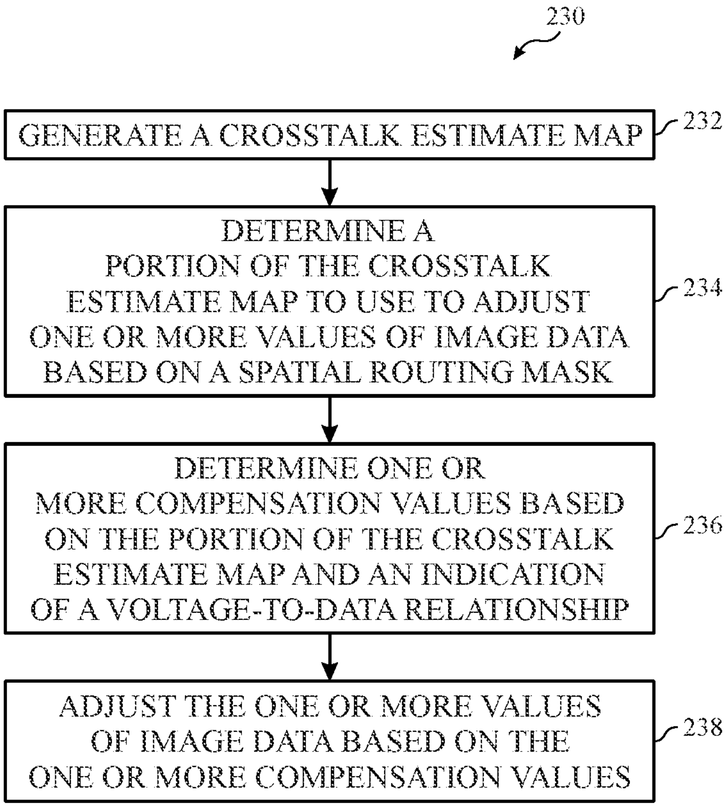
FIG. 12 is a flowchart of a method of operating the compensation system of FIG. 10 to compensate for the example coupling effects shown in FIGS. 8-9, in accordance with an embodiment.

Keeping the foregoing in mind, FIG. 12 is a flowchart of a method 230 of operating the compensation system 150 to compensate for crosstalk that may be caused by the fanout 68. While the method 230 is described using process blocks in a specific sequence, it should be understood that the present disclosure contemplates that the described process blocks may be performed in different sequences than the sequence illustrated, and certain described process blocks may be skipped or not performed altogether. Furthermore, although the method 230 is described as being performed by processing circuitry, it should be understood that any suitable processing circuitry such as the processor core complex 18, image processing circuitry, image compensation circuitry, or the like may perform some or all of these operations.

At block 232, the compensation system 150 may generate a crosstalk estimate map 160. The compensation system 150 may process the image data 48A to be sent to one or more pixels 54 (e.g., self-emissive pixels) disposed in an active area 74 (e.g., an active area semiconductor layer comprising circuitry to provide an active area). The pixels 54 may emit light based on image data 48. The compensation system 150 may process and adjust each value of the one or more values of the image data independently, and thus may eventually generate compensation values 166 tailored for each of one or more pixels 54 or for each pixel 54 of the active area. A fanout 68 may couple driver circuitry 72 to the one or more pixels 54 of the active area 74. However, the active area 74 may be disposed on the driver circuitry 72. Thus, to couple the active area 74 and the driver circuitry 72, the fanout 68 may fold over some of the active area 74. In this way, as shown in FIG. 7, the fanout 68 may be disposed at least partially on the active area 74 in association with a region, where the region corresponds to a physical overlapping portion of the circuitry of the fanout 68 with the circuitry of the active area 74. The fanout 68 may transmit the image data 48 to the one or more self-emissive pixels. The fanout 68 may include a plurality of respective couplings that vary in width between the respective couplings over a length of the fanout. In other words, couplings between the driver circuitry 72 may start out tightly packed together at an input to the fanout 68 and may gradually be disposed further and further apart as approaching the active area 74 boundary. When transmitting image data 48 from the driver circuitry 72 to one or more of the pixels 54, the fanout 68 may capacitively couple to the circuitry of the active area 74 within the region. The compensation system 150 may adjust one or more values of the image data 48 corresponding to the region based on a spatial routing mask. As described above, the compensation system 150 may adjust one or more values of the image data 48 based on a spatial routing mask corresponding to the region 78 to negate the capacitive coupling between the fanout 68 and the active area 74.

With this in mind, the compensation system 150 may include a buffer 182 that stores one or more previous rows of image data 48. The buffer 182 may be used to generate crosstalk estimate map 160, like was described in FIGS. 10-11. In some cases, the compensation system 150 may include a differentiated line buffer 184 that generates the crosstalk estimate map 160 based on differences (e.g., changes) in voltage values between adjacent rows of the one or more previous rows of image data 48. Although rows are described, it should be understood that these operations may be performed relative to regions of pixels 54, portions of the active area 74, columns of the active area (e.g., scan lines, gate control lines), or the like.

At block 234, the compensation system 150 may determine a portion of the crosstalk estimate map 160 to use to adjust one or more values of image data 48A based on a spatial routing mask 154, where the spatial routing mask 154 matches a geometric arrangement of the region 78 (e.g., a triangular region or other geometric shape)

At block 236, the compensation system 150 may determine one or more compensation values 166 based on the portion of the crosstalk estimate map 160 and an indication of a relationship 164 (e.g., a voltage-to-data relationship) to use to adjust one or more values of image data 48A. The one or more compensation values 166 based reflect logical boundaries 194 of the spatial routing mask 154. For example, a subset of the one or more compensation values 166 may correspond zeroed data when associated with a position outside of the logical boundaries 194 of the spatial routing mask 154.

At block 238, the compensation system 150 may adjust the one or more values of the image data 48A based on the one or more compensation values 166. The compensation system 150 may include an adder 212. The adder 212 may combine the one or more values of the image data 48 and the compensation values 166 to generate adjusted image data 48B. The adjusted image data 48B may include a portion of unchanged, original image data and a portion of adjusted image data, where relative arrangements of both portions of data correspond to the routing mask 190, and thus a geometric arrangement of the region. The compensation system 150 may transmit the adjusted image data 48B to the driver circuitry 72 as image data 48 in FIG. 6. The driver circuitry 72 may use the adjusted image data 48B to generate control and data signals for distribution to the one or more pixels 54. When driving the pixels 54 with the compensated image data, any crosstalk or distortions that may occur from the fanout 68 coupling to one or more portions of the active area 74 circuitry may merely adjust the signals down or up to a voltage level originally instructed via the image data 48A, thereby correcting for effects from the fanout 68 coupling.

The operations of FIG. 12 may be applied to compensate a single pixel 54 as well, or may be described in terms of compensation of a first pixel 54. To elaborate, a method may include generating, via a compensation system 150, a crosstalk estimate (e.g., a portion of the crosstalk estimate map 160) corresponding to a first pixel 54. The method may include determining, via the compensation system 150, to adjust a portion of the image data 48A corresponding to the first pixel 54 based on the crosstalk estimate, where the determination may be based on a location of the first pixel being within a region of the active area 74 corresponding to the spatial routing mask 154. The method may involve determining, via the compensation system 150, a compensation value 166 based on the crosstalk estimate and the indication of a relationship 164 (e.g., a voltage-to-data relationship) associated with the first pixel 54. The method may also include adjusting, via the compensation system 150, the image data based on the compensation value. Determining to adjust the image data may be based on a location of the first pixel 54 and based on a value of the crosstalk estimate. For example, the method may include comparing, via the compensation system 150, the value of the crosstalk estimate to a threshold level of expected crosstalk. In response to the value of the crosstalk estimate being greater than or equal to the threshold level of the expected crosstalk and the spatial routing mask 154 indicating that the location of the first pixel 54 falls within the region 78 of the active area 74 corresponding to the overlapping fanout 68, determining, via the compensation system 150, to adjust the portion of the image data 48A corresponding to the first pixel based on the crosstalk estimate. However, in response to the value of the crosstalk estimate being less than the threshold level of the expected crosstalk and/or the first pixel 54 being outside the region 78), determining, via the compensation system 150, to disregard (e.g., discard or zero) the crosstalk estimate without adjusting the image data 48A corresponding to the first pixel 54. Although this method is described relative to a first pixel 54, it should be understood that multiple pixels could undergo a similar adjustment operation based on the spatial routing mask 154 and a threshold.

In some embodiments, the spatial routing mask 154 may be hardcoded at manufacturing since the location of the fanout 68 relative to the active area 74 may be fixed during manufacturing and prior to deployment in the electronic device 10. When hardcoded, the spatial routing mask 154 may be a relatively passive software operation that passes on a subset of the crosstalk estimate map 160 to the pixel error estimator 156.

Furthermore, there may be some instances where the spatial routing mask 154 is skipped or not used, such as when the fanout 68 affects an entire active area 74. In these cases, the crosstalk estimate map 160 may be sent directly to the pixel error estimator 156, bypassing the spatial routing mask 154 when present as opposed to being omitted. Similarly, any suitable geometric shaped mask may be used. Herein, a triangular mask (e.g., example mask 198) was described in detail but a rectangular shaped mask, an organic shaped mask, a circular mask, or the like, may be used. In some cases, a threshold-based mask may be applied via the spatial routing mask 154. For example, the crosstalk estimate map 160 may be compared to a threshold value of crosstalk and a respective coordinate of the crosstalk estimate map 160 may be omitted (e.g., indicated as a "0" in the mask) when the identified crosstalk of the crosstalk estimate map 160 does not exceed a threshold value. When a respective value of the crosstalk estimate map 160 exceeds a threshold value, the spatial routing mask 154 may retain the corresponding crosstalk value as part of the masked crosstalk estimate map 162. Thus, thresholds may be used when determining a geometry of the spatial routing mask 154 (e.g., during manufacturing to identify regions of the active area 74 that experience relatively more crosstalk than other regions, during use to identify a subset of image data to be compensated when the crosstalk is expected to be greater than a threshold) and/or when determining to which values of crosstalk to apply an existing geometry of the spatial routing mask 154. For example, within a triangular "1" region 78 of the routing mask 190 of FIG. 11, crosstalk estimates may be omitted (e.g., zeroed) in the masked crosstalk estimate map when the crosstalk value itself is less than a threshold amount of crosstalk despite the crosstalk estimates otherwise being flagged for retention by the routing mask 190. Other thresholding examples may apply as well.

In some cases, the data-to-crosstalk relationship may be defined on a per-pixel or regional basis, such that one or more pixel behaviors or one or more location-specific behaviors are captured in a respective relationship. For example, based on a specific location of a pixel, that pixel (or circuitry at that location in the active area) may experience a different amount of crosstalk (resulting in a different amount of data distortion) than a pixel or circuitry at a different location. A per-pixel (or location-specific) data-to-crosstalk relationship may capture the specific, respective behaviors of each pixel (or each region) to allow suitable customized compensation for that affected pixel. In a similar way, the pixel error estimator 156 may identify changes in image data on a regional basis, such as by using relationships that correlate expected crosstalk experienced by a region to expected changes in image data to occur at pixels within that region.

This disclosure describes systems and methods that compensate for crosstalk errors that may be caused by a fanout overlaid or otherwise affecting signals transmitted within an active area of an electronic display. Technical effects associated with compensating for the crosstalk errors include improved display performance as potentially occurring image artifacts are mitigated (e.g., made unperceivable by an operator, eliminated). Other effects from compensating for the fanout crosstalk errors may include improved or more efficient consumption of computing resources as a likelihood of an incorrect application selection may be reduced when the quality of image presented via a display is improved. Moreover, systems and methods described herein are based on previously transmitted image data being buffered as well as a routing mask. The routing mask may make compensation operations more efficient by enabling localized compensation operations based on a region corresponding to the crosstalk. Buffering previously transmitted image data rows may improve a quality of compensation by increasing an ability of the compensation system to tailor corrections to the crosstalk experienced. Indeed, since crosstalk varies based on differences in voltages transmitted via couplings in the active area, buffering past rows of image data may enable operation-by-operation specific compensations to be performed.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device, comprising:

one or more display pixels disposed in an active area, wherein the one or more display pixels are configured to emit light based on image data;

a fanout configured to couple to the one or more display pixels, wherein the fanout is disposed at least partially on the active area in a region, and wherein the fanout configured to transmit the image data to the one or more display pixels; and a compensation system configured to determine one or more compensation values to use to adjust one or more values of the image data corresponding to the region based on a spatial routing mask corresponding to the region.

2. The electronic device of claim 1, wherein the fanout comprises a plurality of respective couplings having a first coupling and a second coupling, wherein the fanout is characterized by a first width between the first coupling and the second coupling at a first side at an input, and wherein the fanout is characterized by a second width between the first coupling and the second coupling at an output.

3. The electronic device of claim 1, comprising driving circuitry configured to output the image data, wherein the fanout is configured to transmit the image data from the driving circuitry to the one or more display pixels.

4. The electronic device of claim 1, wherein the fanout is configured to couple via a capacitance to at least a portion of the active area when transmitting the image data to the one or more display pixels.

5. The electronic device of claim 1, wherein the spatial routing mask matches a geometric arrangement of the region.

6. The electronic device of claim 1, wherein the compensation system comprises a buffer configured to store one or more previous rows of image data, and wherein the compensation system is configured to:

generate a crosstalk estimate map based on the one or more previous rows of image data and the region associated with the fanout, wherein the crosstalk estimate map comprises indications of a plurality of expected voltages configured to distort the image data;

determine a portion of the crosstalk estimate map based on the spatial routing mask;

determine the one or more compensation values based on the portion of the crosstalk estimate map and an indication of a relationship; and adjust the one or more values of the image data based on the one or more compensation values.

7. The electronic device of claim 6, wherein the compensation system comprises an adder, wherein the adder is configured to combine the one or more values of the image data and the one or more compensation values, wherein resulting adjusted image data comprises:

a portion of unchanged image data; and a portion of adjusted image data corresponding to a geometric arrangement of the region.

8. The electronic device of claim 6, wherein the compensation system comprises a differentiated line buffer configured to generate the crosstalk estimate map based on differences in voltage values between adjacent rows of the one or more previous rows of image data.

9. The electronic device of claim 6, wherein the spatial routing mask is configured as a triangular logical region.

10. The electronic device of claim 1, wherein the compensation system is configured to adjust the one or more values of the image data independently.

11. A method comprising:

generating, via a compensation system, a crosstalk estimate for a first pixel;

determining, via the compensation system, to adjust image data for the first pixel based on the crosstalk estimate based on a location of the first pixel being within a region of an active area corresponding to a spatial routing mask;

determining, via the compensation system, a compensation value based on the crosstalk estimate and an indication of a voltage relationship associated with the first pixel; and adjusting, via the compensation system, the image data based on the compensation value.

12. The method of claim 11, wherein determining to adjust the image data is based on the location of the first pixel and based on a value of the crosstalk estimate.

13. The method of claim 12, comprising:

comparing, via the compensation system, the value of the crosstalk estimate to a threshold level of expected crosstalk;

in response to the value of the crosstalk estimate being greater than or equal to the threshold level of the expected crosstalk and the spatial routing mask indicating that the location of the first pixel falls within the region of the active area, determining, via the compensation system, to adjust the image data based on the crosstalk estimate; and in response to the value of the crosstalk estimate being less than the threshold level of the expected crosstalk, determining, via the compensation system, to discard the crosstalk estimate before adjusting the image data with the crosstalk estimate.

14. The method of claim 11, wherein generating the crosstalk estimate comprises:

receiving, via the compensation system, the image data;

reading, via the compensation system, one or more previous rows of image data stored in a buffer; and generating, via the compensation system, the crosstalk estimate based at least in part on changes in voltage between the image data and the one or more previous rows of image data different from a row of the image data.

15. The method of claim 11, comprising:

determining that the location of the first pixel being within the region of the active area corresponding to the spatial routing mask based on the image data corresponding to a coordinate location within logical boundaries of the spatial routing mask.

16. A system, comprising:

a first pixel disposed in an active area;

a fanout configured to couple to the first pixel to deliver image data to the first pixel, wherein the fanout is disposed at least partially on the active area in a region; and a compensation system configured to:

determine a compensation value to use to adjust a value associated with the image data at least in part by:

generating a crosstalk estimate for the first pixel; and determining to adjust the image data corresponding to the first pixel based on a spatial routing mask associated with the region; and adjust the image data based on the crosstalk estimate in response to determining to adjust the image data based on the spatial routing mask.

17. The system of claim 16, wherein the compensation system is configured to determine to adjust the image data based on a location associated with the first pixel being within the region.

18. The system of claim 16, determining, via the compensation system, the compensation value based on the crosstalk estimate and an indication of a voltage relationship associated with the first pixel, wherein the voltage relationship corresponds the crosstalk estimate to an offset value to be applied to the image data to compensate for a coupling effect associated with the fanout.

19. The system of claim 18, wherein the compensation system comprises adder logic circuitry, wherein the adder logic circuitry is configured to increase the value associated with the image data by the offset value to generate adjusted image data.

20. The system of claim 16, wherein the compensation system is configured to generate the crosstalk estimate based on a plurality of previous rows of image data corresponding to a row comprising the first pixel.

* * * * *